(12) United States Patent
Wang

(10) Patent No.: US 9,462,024 B2
(45) Date of Patent: Oct. 4, 2016

(54) SYSTEM AND METHOD OF MEDIA CONTENT STREAMING WITH A MULTIPLEXED REPRESENTATION

(75) Inventor: Ye-Kui Wang, San Diego, CA (US)

(73) Assignee: Futurewei Technologies, Inc., Plano, TX (US)

(*) Notice: Subject to any disclaimer, the term of this patent is extended or adjusted under 35 U.S.C. 154(b) by 167 days.

(21) Appl. No.: 13/446,800

(22) Filed: Apr. 13, 2012

(65) Prior Publication Data

US 2012/0317303 A1 Dec. 13, 2012

Related U.S. Application Data

(60) Provisional application No. 61/494,806, filed on Jun. 8, 2011.

(51) Int. Cl.
| | |
|---|---|
| H04L 29/06 | (2006.01) |
| H04N 21/266 | (2011.01) |
| H04N 21/658 | (2011.01) |
| H04N 21/845 | (2011.01) |
| H04N 21/854 | (2011.01) |

(52) U.S. Cl.
CPC ......... *H04L 65/602* (2013.01); *H04L 65/4076* (2013.01); *H04L 65/607* (2013.01); *H04L 65/608* (2013.01); *H04N 21/266* (2013.01); *H04N 21/6581* (2013.01); *H04N 21/8455* (2013.01); *H04N 21/8456* (2013.01); *H04N 21/85406* (2013.01); *H04L 29/06027* (2013.01); *H04L 65/1083* (2013.01)

(58) Field of Classification Search
None
See application file for complete search history.

(56) References Cited

U.S. PATENT DOCUMENTS 5,973,679 A * 10/1999 Abbott et al. ................ 715/203
7,669,128 B2 * 2/2010 Bailey et al. ................ 715/719

(Continued)

OTHER PUBLICATIONS

ISO/IEC/JTC1/SC29; ISO/IEC FCD 23001-6; ISO/IEC JTC 1/SC 29/WG 11, "Information Technology—MPEG systems technologies—Part 6: Dynamic adaptive streaming (DASH)," STD Version 2.1c2, ISO/IEC 2011; 99 pages.

(Continued)

*Primary Examiner* — Kevin Bates
*Assistant Examiner* — Jeyanath Jeyaratnam
(74) *Attorney, Agent, or Firm* — Slater Matsil, LLP

(57) ABSTRACT

In accordance with an embodiment, a method of operating a streaming media client includes electronically receiving, from a network, information regarding component access points of a first multiplexed representation of a streaming content. The first multiplexed representation of the streaming content includes a plurality of media components, and each component access point defines an independently coded access point for one of the plurality of media components. The method further includes selecting a first segment of the first multiplexed representation of the streaming content based on the information regarding the component access points, and requesting the selected first segment of the first multiplexed representation of the streaming content from the network.

41 Claims, 7 Drawing Sheets

(56) References Cited

U.S. PATENT DOCUMENTS

| | | | |
|---|---|---|---|
| 7,916,755 B2 * | 3/2011 | Hasek et al. | 370/486 |
| 8,032,649 B2 * | 10/2011 | Gupta et al. | 709/231 |
| 8,060,641 B2 * | 11/2011 | Gupta et al. | 709/232 |
| 8,341,255 B2 * | 12/2012 | Gopalakrishnan | 709/223 |
| 8,352,996 B2 * | 1/2013 | Khouzam et al. | 725/109 |
| 2009/0319563 A1 * | 12/2009 | Schnell | 707/103 R |
| 2011/0087794 A1 | 4/2011 | Li et al. | |
| 2011/0119394 A1 | 5/2011 | Wang et al. | |
| 2011/0125919 A1 * | 5/2011 | Kwon et al. | 709/231 |
| 2011/0179185 A1 | 7/2011 | Wang et al. | |
| 2011/0196981 A1 | 8/2011 | Li et al. | |
| 2012/0317189 A1 * | 12/2012 | Einarsson et al. | 709/203 |

OTHER PUBLICATIONS

ISO/IEC JTC 1/SC29; ISO/IEC 14496-12:2008/FPDAM & ISO/IEC 15444-12:2008/DAM 3; "Information Technology—Coding of audio-visual objects—Part 12:ISO base media file format, Amendment 3: DASH support and RTP reception hint track processing," STD Version 2.1c; ISO/IEC 2011; 53 pages.

* cited by examiner

SYSTEM AND METHOD OF MEDIA CONTENT STREAMING WITH A MULTIPLEXED REPRESENTATION

CROSS REFERENCE TO RELATED APPLICATIONS

This patent application claims priority to U.S. Provisional Application No. 61/494,806 filed on Jun. 8, 2011, entitled "System and Method of HTTP Streaming with Multiplexed Representation," which application is incorporated by reference herein in its entirety.

TECHNICAL FIELD

The present invention relates generally to communication systems, and more particularly to a system and method for media content streaming with multiplexed representations.

BACKGROUND

As the capability of IP networks and network infrastructure has increased, and the quality of Internet-based video streaming technology has improved, the popularity of Internet streaming for video distribution has increased tremendously. One common method of implementing streaming video is transmitting the video program from a Hypertext Transfer Protocol (HTTP) server to a web-based HTTP client. Web-based streaming video is pervasive because of the simplicity of access, in that a user simply clicks on a link to view video content.

Video streaming technology faces some difficulties, however. In some cases, when a user requests video content, there can be a considerable delay before the content starts playing. In some cases, streaming video content is interrupted or stalled because of heavy network and/or poor link conditions. In other cases, even if the network link initially starts out good, the viewing experience may be later degraded due to changing network conditions.

SUMMARY OF THE INVENTION

In accordance with an embodiment, a method of operating a streaming media client includes electronically receiving, from a network, information regarding component access points of a first multiplexed representation of a streaming content. The first multiplexed representation of the streaming content includes a plurality of media components, and each component access point defines an independently coded access point for one of the plurality of media components. The method further includes selecting a first segment or subsegment of the first multiplexed representation based on the information regarding the component access points, and requesting the selected first segment or subsegment of the first multiplexed representation from the network.

In accordance with a further embodiment, a method of operating a streaming media server includes electronically transmitting to a client information regarding component access points of a first multiplexed representation of a streaming content. The first multiplexed representation of the streaming content includes a plurality of media components, and each component access point defines an independently coded access unit for one of the plurality of media components. The method further includes receiving a request from the client for a first segment or subsegment of the first multiplexed representation of the streaming content according to a selected component access point, and transmitting the requested first segment or subsegment of the first multiplexed representation of the streaming content to the client.

In accordance with a further embodiment, a system for receiving streaming media content includes a communications adapter and a processor. The communication adapter receives information regarding component access points of a first multiplexed representation of a streaming content from a network, wherein the first multiplexed representation of the streaming content includes a plurality of media components, and each component access point defines an independently coded access unit for one of the plurality of media components. The processor selects a first segment or subsegment of the first multiplexed representation of the streaming content based on the information regarding the component access points, and requests the selected first segment or subsegment of the first multiplexed representation of the streaming content.

In accordance with a further embodiment, a non-transitory computer readable medium having an executable program stored thereon that instructs a microprocessor to perform the steps of receiving, from a network, information regarding component access points of a first multiplexed representation of a streaming content, selecting a first segment or subsegment of the first multiplexed representation of the streaming content based on the information regarding the component access points, and requesting the selected first segment or subsegment of the first multiplexed representation of the streaming content from the network. The first multiplexed representation of the streaming content includes a plurality of media components, and each component access point defines an independently coded access unit for one of the plurality of media components.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to embodiments in specific contexts, for example, a system and method for media content streaming. In particular, some embodiments relate to streaming of media content based on the HTTP protocol.

Figures 1, 2A, 2B:
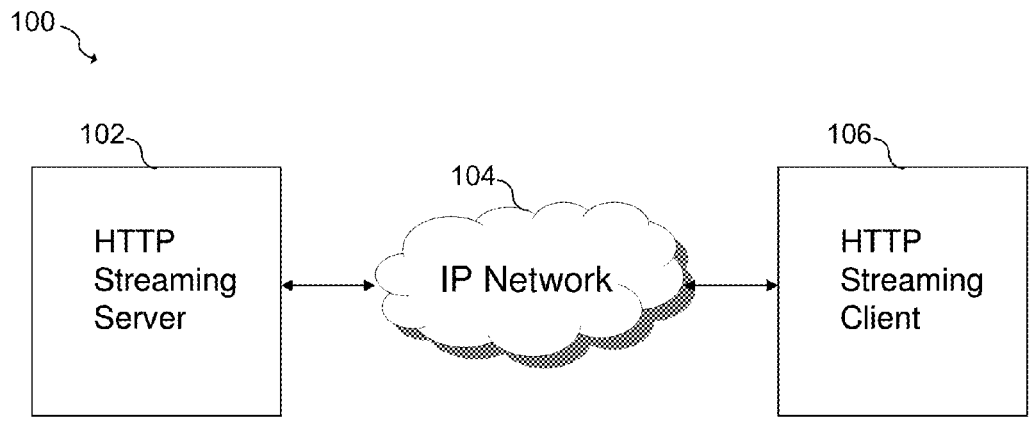
FIG. 1 illustrates a media streaming system.
FIGS. 2a-c illustrate an embodiment data structures.

FIG. 1 illustrates HTTP-based media content streaming system 100 that implements concepts and methods of the present invention. System 100 has HTTP streaming server 102 that transmits streaming media to HTTP streaming client 106 via IP network 104. It should be appreciated that alternative embodiments can also be directed toward other streaming systems besides HTTP streaming systems.

Embodiments of the present invention utilize systems and methods for HTTP streaming of multimedia streams of audio and/or video and/or other media types.

Streaming refers to the multimedia service where users simultaneously receive and playback media contents. Conventional streaming solutions use the protocol set of RTP/UDP/IP for transport of media data, encapsulated as RTP packets, and use RTSP for session control and SDP for session description.

HTTP adaptive streaming refers to the streaming service wherein the HTTP protocol is used for transport of media data. In HTTP adaptive streaming, the protocol set of HTTP/TCP/IP is used for transport of media data, "encapsulated" as files or parts of files, HTTP is used for the control of the streaming processes, and XML is typically used for description of the media. The description is typically referred to as media presentation description (MPD) or manifest.

Compared to RTSP/RTP based streaming, HTTP adaptive streaming is advantageous in that it has the ability to use standard servers and standard HTTP caches, or inexpensive servers in general, to deliver content from a CDN or any other standard server farm. Furthermore, HTTP adaptive streaming ability to move control of "streaming session" entirely to the client, which basically only opens one or several TCP connections to one or several standard HTTP servers or caches. HTTP adaptive streaming may also enable easy and effortless streaming services by avoiding Network Address Translation (NAT) and firewall traversal issues, and enables start of the streaming process after transmitting fewer protocol messages. While Forward Error Correction (FEC) may be needed in some RTSP/RTP based streaming systems, it may not be required in HTTP adaptive streaming. Therefore, overhead caused by FEC may be reduced.

Thanks to these advantages, HTTP adaptive streaming has become popular recently and has been adopted by many companies as a way to deliver video through the Internet. Success stories of HTTP adaptive streaming include smooth streaming of Microsoft Silverlight, dynamic streaming of Adobe Flash, quantum streaming of Move Networks, and live streaming of Apple. Standard development organizations, such as 3GPP, OIPF (the Open IPTV Forum), and MPEG have been working towards international standards on HTTP adaptive streaming. 3GPP completed its Release 9 Adaptive HTTP Streaming (AHS) standard in March 2010 and the its Release 10 3GPP Dynamic Adaptive Streaming over HTTP (3GP-DASH) standard in June 2011, and OIPF has completed its HTTP Adaptive Streaming (HAS) standard in August 2010. MPEG's Dynamic Adaptive Streaming over HTTP (DASH) standard was completed in July 2011.

Both conventional RTSP/RTP-based streaming and HTTP adaptive streaming allow a streaming server to provide multiple versions of a media content, which may differ in spatial resolution, bit rate, frame rate, and so on. Clients may choose an appropriate content version at the beginning of the streaming process based on the connecting bandwidth, the client's capabilities as well as user preferences. By provisioning of multiple content versions, clients may also perform stream adaption. For example a client may start streaming at a first bit rate, but later switch to a different bitrate when the connecting network bandwidth changes during a streaming session.

OIPF HAS and MPEG DASH specify support for two types of streaming contents: one based on ISO base media file format (ISOBMFF, also widely referred to as MP4 file format); and one based on MPEG-2 Transport Stream (TS). 3GPP AHS, on the other hand, only specifies support for ISOBMFF based streaming contents.

Among the existing HTTP adaptive streaming approaches, including 3GPP AHS, OIPF HAS, and MPEG DASH, there lacks a mechanism for efficient support of multiplexed representations. A multiplexed representation refers to a representation that contains more than one media component. A media component is an encoded version of one individual media type such as audio, video or timed text with specific attributes, e.g. bandwidth, language, or resolution. In particular, the cases wherein at least two of the media components contained (also referred to as multiplexed) in a representation were encoded in such a way that not all access units are independently coded were not supported by conventional systems.

FIG. 2a illustrates various ways of components being combined into various multiplexed representations. In one example two video sources, VIDEO 1 and VIDEO 2, and two audio sources AUDIO 1 and AUDIO 2, are combined into four multiplexed representations. For example multiplexed representation 1 combines VIDEO 1 and AUDIO 1. Remaining representations 2-4 denote other combinations of the video and audio sources. In one embodiment, VIDEO 1 may be associated with a 1 Mbps video stream, and VIDEO 2 may be associated with a 2 Mbps video stream. Likewise, AUDIO 1 may be associated with an English language audio stream, and AUDIO 2 may be associated with a Spanish language audio stream. FIG. 2b provides an example of how these various streams may be multiplexed.

It should be appreciated that the embodiments shown in FIGS. 2a-b are simple illustrative examples of many possible embodiment multiplexed representations. In embodiments of the present invention, video and audio streams may be included in any number of different representations. Furthermore, other types of streaming data may also be included along with video and/or audio streams.

For simplicity of description, described embodiments are directed toward MPEG-based systems described the in following standards documents, which are incorporated by reference herein in their entirety: MPEG output document W11930 (v2): Study Text of ISO/IEC 23001-6: Dynamic adaptive streaming over HTTP (DASH) DIS; and on MPEG output document W11921: Text of ISO/IEC 14496-12: 2008|15444-12:2008 (3rd edition)/Amendment 3: DASH support and RTP reception hint track processing. It is understood, however, that the inventive concepts can be applied to other situations as well.

Embodiments of the invention may provide one or more of the following: an improved definition of Representation Access Point (RAP); a newly introduced definition of a Component Access Point (CAP); an improved mechanism for identifying and signaling of media segments or subsegments starting with a Representation Access point in a multiplexed representation; an improved mechanism for signaling of representation access points and/or component access points in media segments of a multiplexed representation; and an improved mechanism for signaling of the presentation time of the first representation access point and/or component access points in a sub-segment in a media segment of a multiplexed representation.

A Representation Access Point (RAP) is a position in a representation that is identified as being a position for which it is possible to start playback using only the information contained in data in the representation starting from that position onwards. In some embodiments, playback is preceded by initialising with an initialisation segment, if any.

In an embodiment, each RAP is associated with two properties: $I_{RAP}$ and $T_{RAP}$. $T_{RAP}$ is the earliest presentation time such that, for each media component contained in the representation, all access units with presentation time greater than or equal to $T_{RAP}$ can be correctly decoded using data in the Representation starting at $I_{RAP}$ and no data before $I_{RAP}$ (preceded by initialising with the Initialisation Segment, if any). $I_{RAP}$ is the greatest position in the Representation such that, for each media component contained in the Representation, all access units with presentation time greater than or equal to $T_{RAP}$ can be correctly decoded using data in the Representation starting at $I_{RAP}$ and no data before $I_{RAP}$ (preceded by initialising with the Initialisation Segment, if any).

RAPs may be used to randomly access a media presentation, for example at the start-up of the media presentation or after a seeking operation. In addition, RAPs may permit switching between two representations. For seamless switching, the switch-from representation is presented up to $T_{RAP}$ and the switch-to representation is presented from the representation Access Point starting from $T_{RAP}$.

There are obvious benefits for the client to be able to identify RAPs and one or several of their properties, in particular $I_{RAP}$ and $T_{RAP}$, without requiring to access data at positions following $I_{RAP}$. Such information may be provided explicitly in the segment index or at least implicitly in the MPD by using the flags @startWithRAP, @segmentAlignment, and @subSegmentAlignment.

A Component Access Point (CAP) for a particular media component in a representation is defined as a position in the representation that is identified as being a position for which it is possible to start playback that media component using only the information contained in data in the Representation starting from that position onwards (preceded by initializing with the Initialization Segment, if any).

In an embodiment, each CAP is associated with five properties, $I_{CAP}$, $T_{CAP}$, $P_{RAP}$, $X_{RAP}$, and $Y_{RAP}$. $T_{CAP}$ is the earliest presentation time such that all access units of the media component with presentation time greater than or equal to $T_{CAP}$ can be correctly decoded using data in the representation starting at $I_{CAP}$ and no data before $I_{CAP}$ (preceded by initialising with the initialisation segment, if any). $I_{CAP}$ is the greatest position in the representation such that all access units of the media component with presentation time greater than or equal to $T_{CAP}$ can be correctly decoded using data in the representation starting at $I_{CAP}$ and no data before $I_{CAP}$ (preceded by initialising with the initialisation segment, if any).

$P_{CAP}$ is the earliest presentation time of any access unit of the media component that can be correctly decoded using data in the representation starting at $I_{CAP}$ and no data before $I_{CAP}$ (preceded by initialising with the Initialisation Segment, if any). $X_{CAP}$ is the earliest presentation time of any access unit of the media component in data in the representation starting at $I_{CAP}$. $Y_{CAP}$ is the presentation time of the first access unit of the reference stream in decoding order in data in the representation starting at $I_{CAP}$. In an embodiment, for any RAP associated with a particular pair of $I_{RAP}$ and $T_{RAP}$ in a representation that contains one or more than one media component, the following statements are applicable: At least one of the media components contains a CAP for which the $I_{CAP}$ is equal to the $I_{RAP}$; at least one of the media components contains a CAP for which the $T_{CAP}$ is equal to the $T_{RAP}$; and each of the media components contains a CAP for which the $I_{CAP}$ is equal to or greater than the $I_{RAP}$ and the $T_{CAP}$ is equal to or less than the $T_{RAP}$.

In an embodiment, four types of CAP may be defined as follows:

Type 1: $X_{CAP}=P_{CAP}=T_{CAP}=Y_{CAP}$;
Type 2: $X_{CAP}=P_{CAP}=T_{CAP}<Y_{CAP}$;
Type 3: $X_{CAP}<P_{CAP}=T_{CAP}$; and
Type 4: $X_{CAP}<=P_{CAP}<T_{CAP}$.

It is noted that the type of CAP is dependent only on which Access Units are decodable and their arrangement in presentation order. Type 1 corresponds to what is known in some coding schemes as a "Closed-GoP random access point," in which all access units, in decoding order, starting from $I_{CAP}$ can be correctly decoded, resulting in a continuous time sequence of decoded access units with no gaps. Here, the first access unit in decoding order in the reference stream starting from $I_{CAP}$ is also the first access unit in presentation order. Type 2 corresponds to what is known in some coding schemes as a "Closed-GoP random access point" wherein the first access unit in decoding order in the reference stream starting from $I_{CAP}$ is not the first access unit in presentation order.

Type 3 corresponds to what is known in some coding schemes as an "Open-GoP random access point" or a "Gradual Decoding Refresh (GDR) random access point," in which there are some access units in decoding order in the reference stream starting from $I_{CAP}$ that cannot be correctly decoded and these access units have presentation times less than $T_{CAP}$. Type 4 corresponds to the case wherein there is at least one access unit in decoding order in the reference stream starting from $I_{CAP}$ that cannot be correctly decoded and has a presentation time greater than $T_{CAP}$.

In some embodiments, CAPs may coincide with random access points in the stream of the media component.

Figure 2C:
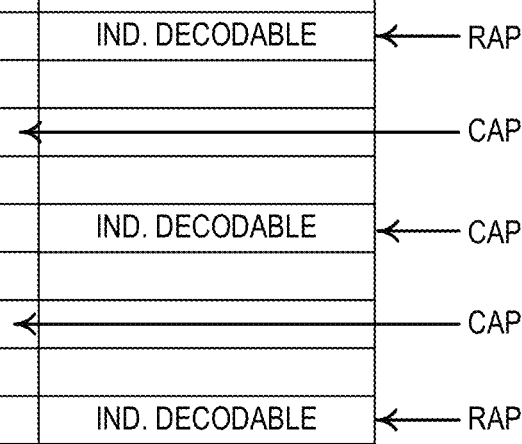

FIG. 2c represents a particular multiplexed representation that contains a video stream and an audio stream. Each index number represents a decodable subsegment. Annotated subsegments that are independently decodable are labeled, while subsegments that are not independently decodable (i.e. that require decoding previous segments) are left blank. Since both video and audio segments at indexes 1 and 9 are independently decodable, indexes 1 and 9 represent RAPs. Video subsegments at indexes 3 and 7 are independently decodable, but the audio subsegments at these indexes are not decodable, therefore Video subsegments at indexes 3 and 7 represent CAPs. Similarly, Audio subsegment and index 5 is independently decodable, while the video subsegment at this index is not. Therefore, the audio subsegment at index 5 is a CAP. In some embodiments, the individual video and audio subsegments at indexes 1 and 9 may also be considered CAPs. It should be appreciated that the example multiplexed representation of FIG. 2C is just one example of a multiplexed representation and its relationship to RAPs and CAPs. In alternative embodiments of the present invention actual multiplexed representations may have more components and greater or fewer subsegments representing various types of streaming media.

Table 1 outlines the Semantics of common attributes and elements that may be provided in a media presentation description (MPD). In one embodiment, URLs may be used, for example, as specified in sub-clause 5.4.4 in MPEG output document W11930 (v2), and representations may be used as specified in sub-clause 5.4.2. Alternatively, other URL and representation definitions may be used.

TABLE 1

Semantics of common attributes and elements are provided in

| Element or Attribute Name | Use | Description |
|---|---|---|
| Common attributes and elements | | |
| @width | O | specifies the horizontal visual presentation size of the video media type on a square grid determined by the @parx and @pary attributes. |
| @height | O | specifies the vertical visual presentation size of the video media type, on a square grid determined by the @parx and @pary attributes. This value should be equal to the vertical pixel resolution of the video. |
| @parx | O | specifies the horizontal size of the encoded video pixels (samples) (in arbitrary units). The default value is 1. |
| @pary | O | specifies the vertical size of the encoded video pixels (in the same arbitrary units as @parx). The default value is 1. |
| @frameRate | O | specifies the output frame rate or the output field rate of the video media type in the Representation for progressive or interlaced video, respectively. If the frame or field rate is varying, the value is the average frame or field rate over the entire duration of the Representation. In case of a multiview complementary Representation, the value indicates the frame or field rate of a single view. |
| @lang | O | specifies the language code(s) for this Representation. Note, multiple language codes may be declared as a white-space separated list and indicate that the Representation may suit a preference for any of the indicated languages. For a full indication of what media is offered under each language, the Initialisation Segment or a Media Segment may have to be accessed. |
| @numberOfChannels | O | specifies the number of audio output channels or a list of available audio channels. For example, @numberOfChannels="5.1 2" for an MPEG Surround Representation |
| @samplingRate | O | A single value specifying the sample rate of the audio stream or a list of sample rates available in the audio stream, e.g. @samplingRate="44100 22050" for an HE-AAC stream with the SBR tool enabled and backwards compatible signalling. |
| @mimeType | must be present on at least one hierarchy level | specifies the MIME type of the Initialisation Segment, if present; if the Initialisation Segment is not present it provides the MIME type of the first Media Segment. |
| @codecs | must be present on at least one hierarchy level | specifies the codecs parameter specifying the media types within the Representation. |
| @group | O | specifies the Group. |
| @maximumRAPPeriod | O | When present, specifies the maximum time interval between the $T_{RAP}$ of any two successive RAPs in seconds in this Representation. |
| @startWithRAP | O | When present and greater than 0, specifies that, in the associated Representations, each media component starts with a CAP in each Media Segment, and the first CAP for each media component in each Media Segment is of a type less than or equal to the value of this attribute. |
| @maxPlayoutRate | O | specifies the maximum playout rate as a multiple of the regular playout rate, which is supported with the same decoder profile and level requirements as the normal playout rate. |

TABLE 1-continued

Semantics of common attributes and elements are provided in

| Element or Attribute Name | Use | Description |
|---|---|---|
| @codingDependency | O | When present and 'true', for all media types, specifies that there is at least one access unit that depends on one or more other access units for decoding. When present and 'false', for any media type, there is no access unit that depends on any other access unit for decoding (e.g. for video all the pictures are intra coded). When not present, there may or may not be coding dependency between access units. |
| ContentProtection | 0 ... N | specifies information about content protection schemes used for this Representation or Group of Representation. When not present the content is neither encrypted nor DRM protected. When multiple elements are present, then the successful processing of one of the elements is sufficient to access the described Representations. |
| Accessibility | 0 ... N | specifies information about Accessibility Information scheme |
| Rating | 0 ... N | specifies information Content rating scheme |
| Viewpoint | 0 ... N | specifies information Content View Point annotation scheme |
| MultipleViews | 0 ... 1 | specifies information for video that contains multiple views |

Legend:
For attributes: M = Mandatory, O = Optional, OD = Optional with Default Value, CM = Conditionally Mandatory.
For elements: <minOccurs> ... <maxOccurs> (N = unbounded)
Elements are bold; attributes are non-bold and preceded with an @.

If @startWithRAP is present and the value is greater than 0, the following applies in the case of an ISO base media file format: (1) In the associated representations, each media component starts with a CAP in each Media Segment, and the first CAP for each media component in each Media Segment is of a type less than or equal to the value of this attribute; (2) If the value of the attribute is equal to 1 or 2, the first access unit in each media component in each Media Segment can be marked as a sync sample by the sync sample table box when present, the absence of the sync sample table box, or the matching indicator in the movie fragment; and (3) If the value of the attribute is equal to 3, the first access unit in each media component in each Media Segment can be marked as a member of a sample group of type 'rap', or as a member of a sample group of type 'roll' wherein the value of the roll_distance field is greater than 0.

In an embodiment, the XML syntax of common attributes and elements are provided in Table 2.

TABLE 2

XML Syntax of Common Attributes and Elements

```
<!-RepresentationBase type; extended by other Representation-related types →
<xs:complexType name="RepresentationBaseType">
    <xs:sequence>
        <xs:element name="ContentProtection" type="ContentDescriptorType"
                                                            minOccurs="0"
maxOccurs="unbounded"/>
        <xs:element name="Accessibility" type="ContentDescriptorType"
                                                            minOccurs="0"
maxOccurs="unbounded"/>
        <xs:element name="Rating" type="ContentDescriptorType"
                                                            minOccurs="0"
maxOccurs="unbounded"/>
        <xs:element name="Viewpoint" type="ContentDescriptorType"
                                                            minOccurs="0"
maxOccurs="unbounded"/>
        <xs:element name="MultipleViews" type="MultipleViewsType" minOccurs="0"/>
        <xs:any namespace="##other" processContents="lax" minOccurs="0"
maxOccurs="unbounded"/>
    </xs:sequence>
    <xs:attribute name="Group" type="xs:unsignedInt"/>
    <xs:attribute name="width" type="xs:unsignedInt"/>
    <xs:attribute name="height" type="xs:unsignedInt"/>
    <xs:attribute name="parx" type="xs:unsignedInt"/>
    <xs:attribute name="pary" type="xs:unsignedInt"/>
    <xs:attribute name="lang" type="LangVectorType"/>
    <xs:attribute name="mimeType" type="xs:string"/>
    <xs:attribute name="codecs" type="xs:string"/>
    <xs:attribute name="startWithRAP" type="RAPtype"/>
    <xs:attribute name="frameRate" type="xs:double"/>
    <xs:attribute name="maximumRAPPeriod" type="xs:double"/>
    <xs:attribute name="numberOfChannels" type="StringVectorType"/>
    <xs:attribute name="samplingRate" type="StringVectorType"/>
```

TABLE 2-continued

XML Syntax of Common Attributes and Elements

```
        <xs:attribute name="maxPlayoutRate" type="double"/>
        <xs:attribute name="codingDependency" type="xs: oolean"/>
        <xs:anyAttribute namespace="##other" processContents="lax"/>
    </xs:complexType>
    <!-Type for space delimited list of strings →
    <xs:simpleType name="StringVectorType ">
        <xs:list itemType="xs:string"/>
    </xs:simpleType>
    <!-Type for space delimited list of language codes →
        <xs:simpleType name="LangVectorType">
            <xs:list itemType="xs:language"/>
        </xs:simpleType>
<xs:simpleType name="RAPtype">
    <xs:restriction base="xs:unsignedInt">
        <xs:minInclusive value="0"/>
        <xs:maxInclusive value="4"/>
    </xs:restriction>
</xs:simpleType>
```

In some embodiments, a segment index or metadata may be included with a segment. In an embodiment, a Segment Index Box can be defined as follows:

Box Type: 'sidx'
Container: File
Mandatory: No
Quantity: Zero or more

The Segment Index box ('sidx') provides a compact index of the media segment to which it applies. In some embodiments, the segment index box may be used not only with media formats based on this specification (i.e. files containing sample tables and movie fragments), but also other media formats (for example, MPEG-2 Transport Streams). For this reason, the formal description of the box given here is generic. Furthermore, specific definitions for segments using movie fragments are also given.

Each Segment Index box documents a subsegment, which is defined as a time interval of a segment, ending either at the end of the containing segment, or at the beginning of a subsegment documented by another Segment Index box. A Segment Index box defines how a subsegment is divided into one or more subsegments. In an embodiment, the subsegments, themselves, may be further subdivided using Segment Index boxes.

The indexing may refer directly to the media bytes of a subsegment, or to segment indexes which (directly or indirectly) refer to the media bytes of subsegments. In an embodiment, the segment index may be specified in a 'hierarchical' or 'daisy-chain' or other form by documenting time and byte offset information for other Segment Index boxes applying to the same segment or subsegment.

In Media Segments (i.e., not an Initialization Segment containing only initialization information), the first Segment Index box may document a subsegment that is the entire segment.

Segment Index boxes may be inline in the same file as the indexed media or, in some cases, out-of-line (an index segment, or 'side file') containing only indexing information in some embodiments.

In an embodiment, a Segment Index box contains a sequence of references to subsegments of the subsegment documented by the box. The referenced subsegments are contiguous in presentation time. Similarly, the bytes referred to by a Segment Index box are always contiguous in both the media file and the out-of-line index segment, or in the single file if indexes are placed within the media file. The referenced size gives the count of the number of bytes in the material referenced.

In the file containing the Segment Index box, the anchor point for a Segment Index box is the first byte after that box. If there are two files, the anchor point in the media file is the beginning of the top-level segment (i.e. the beginning of the segment file if each segment is stored in a separate file). The material in the file containing media (which may be the integrated file) starts at the indicated offset from the anchor point. If there are two files, the material in the index file starts at the anchor point, i.e. immediately following the Segment Index box.

One track or stream in the segment (normally a track or stream in which not every sample is independently coded, such as video) is selected as a reference track or stream. The earliest presentation time of the reference track or stream of each referenced subsegment is documented in the Segment Index box. Each reference contains a reference type that defines whether the reference refers directly to the media data of the referenced subsegment or to a Segment Index ('sidx') Box for the referenced subsegment.

Within the two constraints that (1) in time, the subsegments are contiguous in time, that is, each entry in the loop is consecutive from the immediately preceding one and (2) within a given file (integrated file, media file, or index side file) the referenced bytes are contiguous, there are a number of possibilities:

1) A reference to a segment index box may include, in its byte count, immediately following Segment Index boxes that document subsegments;

2) In an integrated file, using the first_offset field, Segment Index boxes are separate from the media to which they refer;

3) In an integrated file, Segment Index boxes for subsegments are located close to the media they index; and 4) When a separate out-of-line index segment is used, loop entries are of a "mixed type;" some to Segment Index boxes in the index segment, and some to media subsegments in the media file.

It is noted that profiles may be used to restrict the placement of segment indexes, or the overall complexity of the indexing.

In an embodiment, the earliest presentation time (for the reference track or stream) of the first subsegment documented in the index is explicitly given. For each subsegment, a subsegment duration is provided. The earliest presentation time of a subsegment may be calculated by summing the subsegment durations of the preceding subsegments and the earliest presentation time of the first subsegment. The earliest presentation time of a subsegment is the earliest presentation time on the reference track timescale of any sample in the reference track of the subsegment.

In an embodiment, a Segment Index box contains a Representation Access Point (RAP) if any entry in the loop contains a RAP.

For files based on ISO base media file format (i.e. based on movie sample tables and movie fragments): (1) a subsegment is a self-contained set of one or more consecutive movie fragments; a self-contained set contains one or more movie fragment boxes with the corresponding media data box(es), and each movie fragment box immediately precedes its corresponding media data box; (2) Segment index boxes are be placed before subsegment material, that is, before any Movie Fragment ('moof') box; (3) streams are tracks in the file format, and stream IDs are track IDs; and presentation times are composition times.

In an embodiment, the syntax for a segment index box may be described as follows:

```
aligned(8) class SegmentIndexBox extends FullBox('sidx', version, 0) {
    unsigned int(32) reference_ID;
    unsigned int(32) timescale;
    if (version==0)
    {
        unsigned int(32) earliest_presentation_time;
        unsigned int(32) first_offset;
    }
    else
    {
        unsigned int(64) earliest_presentation_time;
        unsigned int(64) first_offset;
    }
    unsigned int(16) reserved = 0;
    unsigned int(16) reference_count;
    for(i=1; i <= reference_count; i++)
    {
        bit (1)             reference_type;
        unsigned int(31)    referenced_size;
        unsigned int(32)    subsegment_duration;
        bit(1)              contains_RAP;
        unsigned int(31)    RAP_delta_time;
    }
}
```

The semantics for the above syntax may be provided as follows:

reference_ID provides the stream ID for the reference stream timescale provides the timescale, in ticks per second, for the time and duration fields within this box; in some embodiments, this may match the timescale of the reference stream or track, such as the timescale field of the Media Header Box of the track.

earliest_presentation_time is the earliest presentation time of any sample in the reference stream in the first subsegment, in the timescale indicated in the timescale field;

first_offset is the distance in bytes, in the file containing media, from the anchor point, to the first byte of the indexed material;

reference_count provides the number of referenced items;

reference_type: when set to 1 indicates that the reference is to a segment index ('sidx') box; otherwise the reference is to media content (e.g., in the case of files based on this specification, to a movie fragment box); if a separate index segment is used, then entries with reference type 1 are in the index segment, and entries with reference type 0 are in the media file;

referenced_size: the distance in bytes from the first byte of the referenced item to the first byte of the next referenced item, or in the case of the last entry, the end of the referenced material;

subsegment_duration: when the reference is to Segment Index box, this field carries the sum of the subsegment_duration fields in that box; when the reference is to a subsegment, this field carries the difference between the earliest presentation time of any sample of the reference stream in the next subsegment (or the first subsegment of the next segment, if this is the last subsegment of the segment or the end presentation time of the reference stream if this is the last subsegment of in the reference stream) and the earliest presentation time of any sample of the reference stream in the referenced subsegment; the duration is in the same units as earliest_presentation_time;

contains_RAP: this bit shall be 1 if the referenced material contains at least one RAP; otherwise this bit is set to 0. In other words, when the reference is to a subsegment, then this bit shall be 1 if the subsegment contains at least one RAP, otherwise this bit is set to 0; when the reference is to a segment index, then this bit shall be set to 1 only if any of the references in that segment index have this bit set to 1, and 0 otherwise;

RAP_delta_time: if contains_RAP is 1, provides information on the $T_{RAP}$ of the first RAP in the referenced material; reserved with the value 0 if contains_RAP is 0. The time is expressed as the difference between the $T_{RAP}$ of the first RAP in the referenced material and the earliest_presentation_time field;

In an alternative embodiment, a Segment Index Box may be defined as follows:

Box Type: 'sidx'
Container: File
Mandatory: No
Quantity: Zero or more

The Segment Index box ('sidx') provides a compact index of the media segment to which it applies. It is designed so that it can be used not only with media formats based on this specification (i.e. files containing sample tables and movie fragments), but also other media formats (for example, MPEG-2 Transport Streams). For this reason, the formal description of the box given here is deliberately generic, and the specific definitions for segments using movie fragments are also given.

Each Segment Index box documents a subsegment, which is defined as a time interval of a segment, ending either at the end of the containing segment, or at the beginning of a subsegment documented by another Segment Index box. A Segment Index box defines how a subsegment is divided into one or more subsegments (which may themselves be further subdivided using Segment Index boxes).

The indexing may refer directly to the media bytes of a subsegment, or to segment indexes which (directly or indirectly) refer to the media bytes of subsegments; the segment index may be specified in a 'hierarchical' or 'daisy-chain' or other form by documenting time and byte offset information for other Segment Index boxes applying to the same segment or subsegment.

In Media Segments (i.e., not an Initialisation Segment containing only initialization information), the first Segment Index box documents a subsegment that is the entire segment.

Segment Index boxes may be inline in the same file as the indexed media or, in some cases, out-of-line (an index segment, or 'side file') containing only indexing information.

A Segment Index box contains a sequence of references to subsegments of the subsegment documented by the box. The referenced subsegments are contiguous in presentation time. Similarly, the bytes referred to by a Segment Index box are always contiguous in both the media file and the out-of-line index segment, or in the single file if indexes are placed within the media file. The referenced size gives the count of the number of bytes in the material referenced.

In the file containing the embodiment Segment Index box, the anchor point for a Segment Index box is the first byte after that box. If there are two files, the anchor point in the media file is the beginning of the top-level segment (i.e., the beginning of the segment file if each segment is stored in a separate file). The material in the file containing media (which may be the integrated file) starts at the indicated offset from the anchor point. If there are two files, the material in the index file starts at the anchor point, i.e. immediately following the Segment Index box.

One track or stream in the segment (normally a track or stream in which not every sample is independently coded, such as video) is selected as a reference track or stream. If there are also other tracks or streams in the segment for which not every sample is independently coded, then those other tracks or streams are selected as additional reference tracks or streams.

The earliest presentation time of the reference track or stream of each referenced subsegment is documented in the Segment Index box. Each reference contains a reference type that defines whether the reference refers directly to the media data of the referenced subsegment or to a Segment Index ('sidx') Box for the referenced subsegment.

Within the two constraints (1) that, in time, the subsegments are contiguous, that is, each entry in the i-loop is consecutive from the immediately preceding one and (2) within a given file (integrated file, media file, or index side file) the referenced bytes are contiguous, there are a number of possibilities.

1) a reference to a segment index box may include, in its byte count, immediately following Segment Index boxes that document subsegments;

2) In an integrated file, using the first_offset field, Segment Index boxes are separate from the media to which they refer;

3) In an integrated file, Segment Index boxes for subsegments are located close to the media they index;

4) When a separate out-of-line index segment is used, the i-loop entries are of "mixed type:" some to Segment Index boxes in the index segment, and some to media subsegments in the media file.

It is noted that profiles may be used to restrict the placement of segment indexes, or the overall complexity of the indexing.

The earliest presentation time (for the reference track or stream) of the first subsegment documented in the index is explicitly given. For each subsegment, a subsegment duration is provided. The earliest presentation time of a subsegment may be calculated by summing the subsegment durations of the preceding subsegments and the earliest presentation time of the first subsegment. The earliest presentation time of a subsegment is the earliest presentation time on the reference track timescale of any sample in the reference track of the subsegment.

A Segment Index box contains a Component Access Point (CAP) for the reference stream or an additional reference stream if any entry in the i-loop contains a CAP for the reference stream or an additional reference stream.

For files based on ISO base media file format (i.e. based on movie sample tables and movie fragments): (1) a subsegment is a self-contained set of one or more consecutive movie fragments; a self-contained set contains one or more movie fragment boxes with the corresponding media data box(es), and each movie fragment box immediately precedes its corresponding media data box; (2) Segment Index boxes are placed before subsegment material, that is, before any Movie Fragment ('moof') box; (3) streams are tracks in the file format, and stream IDs are track IDs; and (4) presentation times are composition times.

The syntax of the alternative embodiment segment index box be described as follows:

```
aligned(8) class SegmentIndexBox extends FullBox('sidx', version, 0) {
    unsigned int(32) reference_ID;
    unsigned int(32) timescale;
    if (version==0)
        {
            unsigned int(32) earliest_presentation_time;
            unsigned int(32) first_offset;
        }
    Else
        {
            unsigned int(64) earliest_presentation_time;
            unsigned int(64) first_offset;
        }
    unsigned int(8) reserved = 0;
    unsigned int(16) reference_count;
    unsigned int(8) num_additional_reference_IDs;
    for(k=1; k <= num_additional_reference_IDs; k++)
    {
        unsigned int(32) additional_reference_ID[k];
    }
    for(i=1; i <= reference_count; i++)
    {
        bit (1)                    reference_type;
        unsigned int(31)           referenced_size;
        unsigned int (32) subsegment_duration;
        for(j=0; j <= num_additional_reference_IDs; j++)
        {
            bit(1)                 contains_RAP[j];
            unsigned int(31)       RAP_delta_time[j];
        }
    }
}
```

In the alternate embodiment, the semantics may be provided as follows:

reference_ID provides the stream ID for the reference stream timescale provides the timescale, in ticks per second, for the time and duration fields within this box; it is recommended that this match the timescale of the reference stream or track; for files based on this specification, that is the timescale field of the Media Header Box of the track;

earliest_presentation_time is the earliest presentation time of any sample in the reference stream in the first subsegment, in the timescale indicated in the timescale field;

first_offset is the distance in bytes, in the file containing media, from the anchor point, to the first byte of the indexed material;

reference_count provides the number of referenced items;

num_additional_reference_IDs provides the number of additional reference streams;

additional_reference_ID [k] provides the stream ID for the k-th additional reference stream;

reference_type: when set to 1 indicates that the reference is to a segment index ('sidx') box; otherwise the reference is to media content (e.g., in the case of files based on this specification, to a movie fragment box); if a separate index segment is used, then entries with reference type 1 are in the index segment, and entries with reference type 0 are in the media file;

referenced_size: the distance in bytes from the first byte of the referenced item to the first byte of the next referenced item, or in the case of the last entry, the end of the referenced material;

subsegment_duration: when the reference is to Segment Index box, this field carries the sum of the subsegment_duration fields in that box; when the reference is to a subsegment, this field carries the difference between the earliest presentation time of any sample of the reference stream in the next subsegment (or the first subsegment of the next segment, if this is the last subsegment of the segment or the end presentation time of the reference stream if this is the last subsegment of in the reference stream) and the earliest presentation time of any sample of the reference stream in the referenced subsegment; the duration is in the same units as earliest_presentation_time;

contains_RAP [j]: this bit shall be 1 if the referenced material contains at least one CAP for the reference stream (when j is equal to 0) or the j-th additional reference stream (when j is greater than 0), otherwise this bit is set to 0. In other words, when the reference is to a subsegment, then this bit shall be 1 if the subsegment contains at least one RAP for the reference stream (when j is equal to 0) or the j-th additional reference stream (when j is greater than 0), otherwise this bit is set to 0; when the reference is to a segment index, then this bit shall be set to 1 only if any of the references in that segment index have this bit set to 1, and 0 otherwise;

RAP_delta_time [j]: if contains_RAP [j] is 1, provides information on the $T_{CAP}$ of the first CAP in the referenced material for the reference stream (when j is equal to 0) or the j-th additional reference stream (when j is greater than 0); reserved with the value 0 if contains_RAP [i] is 0. The time is expressed as the difference between the $T_{CAP}$ of the first CAP in the referenced material for the reference stream (when j is equal to 0) or the j-th additional reference stream (when j is greater than 0) and the earliest_presentation_time field.

Figure 3A:
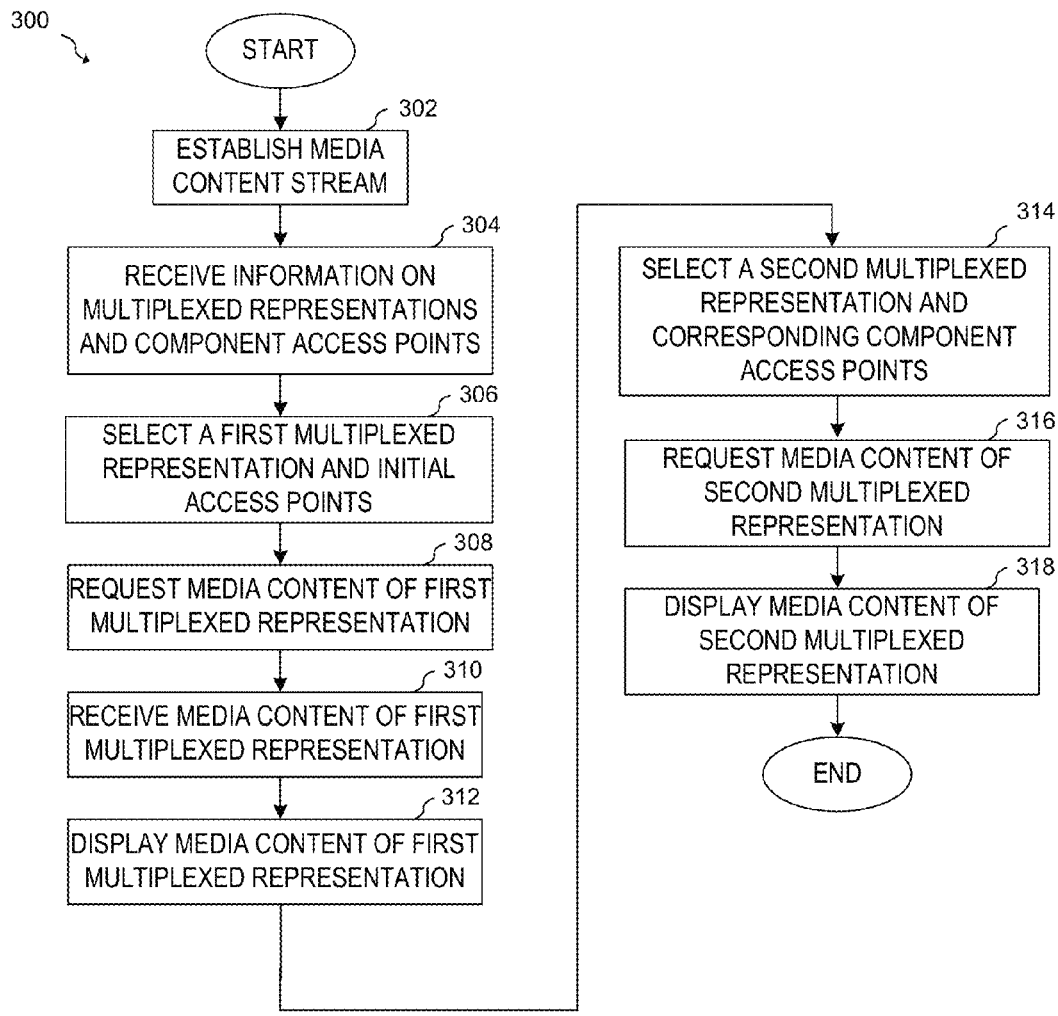
FIGS. 3a-b illustrate embodiment streaming methods.

FIGS. 3-5 illustrate flowcharts depicting example embodiment streaming operations. It should be understood that these figures depict specific examples of many possible embodiment methods. FIG. 3a illustrates a flow diagram of operations 300 in displaying streamed media content. Operations 300 may be indicative of operations occurring in a subscriber as the subscriber displays streamed media content.

Operations 300 may begin with the subscriber or client establishing a media content stream (or connection) with a server (block 302). The connection may or may not be a persistent connection between the subscriber and the server. The subscriber may start to establish the media content stream with the server by sending a request to the server. Such a request may be an HTTP GET request containing the URL of the manifest for the media content, for example. Part of the establishment of the media content stream may be a setting of a variety of parameters of the media content stream, including spatial resolution, bitrate, frame rate, content extras, advertisement level, and so forth. The parameters may be based on the subscriber's subscription level, available communications system bandwidth, operation conditions, and so forth.

In step 304, the client receives information on multiplexed representations and component access points. In an embodiment the information on multiplexed representations may be contained in a manifest file such as an MPD file for a HTTP streaming. In some embodiments component access points may be listed or indexed in a segment index box that is contained in an independent file or contained in the same streaming file as the particular multiplexed representation requested by the client. In step 306, the client selects a first multiplexed representation and initial access points. The selection of the first multiplexed representation may be dependent on the client's network performance, such as bandwidth and quality of service, and the client's preference with respect to language and video resolution. These preferences may be stored in a user setup file on the client, are selected by user correctly. In an embodiment, the initial access points may correspond to a RAP and/or CAP listed in the manifest file and or and index.

Once the multiplexed representation and initial access points are determined, the client requests media content corresponding to the first multiplexed representation as shown in step 308. In an embodiment, this request may comprise submitting a URL of the first multiplexed representation along with an index that corresponds with the initial access points. In step 310, the client receives the media content corresponding to the first multiplexed representation, and the received media content is displayed in step 312.

In an embodiment, the client may decide to switch its multiplexed representation from the first multiplexed representation to a second multiplexed representation (step 314). Such a change in multiplexed representation may occur, for example, if there is a change in network performance that would warrant a switching video streams. For example, if the client detects a decrease in available network bandwidth, the client may want to switch video streams from a high-bandwidth video stream to a low bandwidth video stream. In other situations, the client may switch audio streams from a first language to a second language based on user input. Of course, these are only examples of the many reasons why a client would want to switch a particular representation. Because the various representations are multiplexed, switching at least one stream entails changing from the first multiplexed representation to a second multiplexed representation that corresponds to the particular components required by the client.

In step 316 the client requests media content of the second multiplexed representation. In this step, the client may access a subsegment of a streaming file corresponding to the second multiplexed representation at a subsegment that corresponds with a CAP or RAP defined in the manifest or index in an embodiment. In some embodiments, the access point is determined in such a way that the transition from streaming the first multiplexed representation to the second multiplexed representation is performed in a seamless fashion. By directly accessing an access point based on the CAP or RAP, the transition in representations may be accomplished quickly and efficiently such that the next decodable subsegment is directly accessed without having to search through or download on decodable subsegments. In step 318, the client displays the media content of the second multiplexed representation.

Figure 3B:
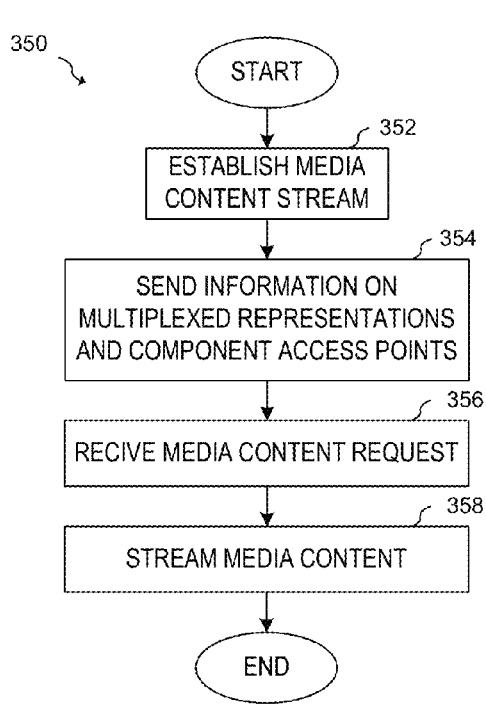

FIG. 3b illustrates a flow diagram of streaming media content operations 350. Operations 350 may be indicative of operations occurring in a server as the server streams media content to a client or subscriber. Operations 350 may begin with the server establishing a media content stream with the subscriber (block 352). The server may establish the media content stream with the subscriber after receiving a request from the subscriber to establish the media content stream with the subscriber. Part of the establishment of the media content stream may be a setting of a variety of parameters of the media content stream, including spatial resolution, bitrate, frame rate, content extras, advertisement level, and so forth. The parameters may be based on the subscriber's subscription level, available communications system bandwidth, operation conditions, and so forth.

According to an example embodiment, the server may send information on multiplexed representations and component access points to the client (step 354). After the server receives a media content request based on the multiplexed representation and access points (step 356), the server streams media content (step 358).

Figure 4A:
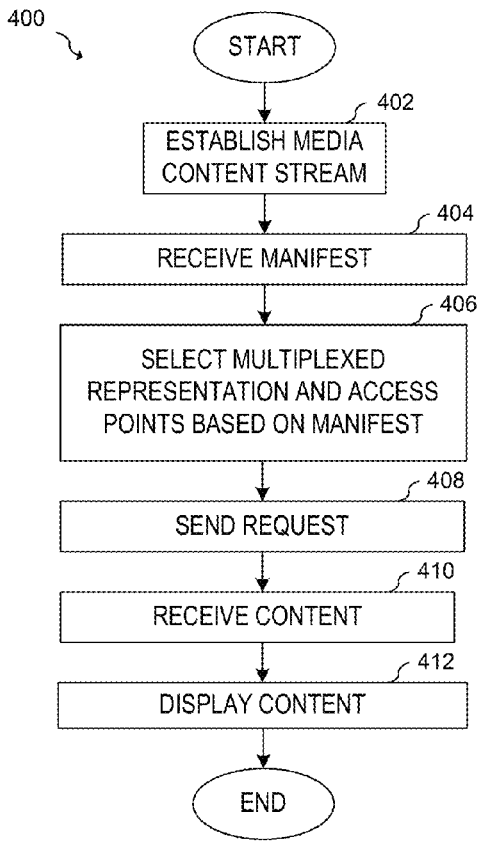
FIGS. 4a-b illustrate further embodiment streaming methods.

FIG. 4a illustrates client operations 400 according to another embodiment of the present invention. In step 402, the client establishes a media content stream. In an embodiment, this media content stream may be established by sending a URL request for a manifest or an MPD. In step 404, the client receives the manifest, and selects a multiplexed representation and access points based on data in the manifest according to embodiments described herein in step 406. In step 408, the client sends a request for the selected multiplexed representation according to the selected access points, and receives the media content in step 410. The client then displays the content (step 412). In an embodiment, the client may switch multiplexed views from the originally selected multiplexed representation to a further multiplexed representation according to client requirements and network performance, as an example.

Figure 4B:
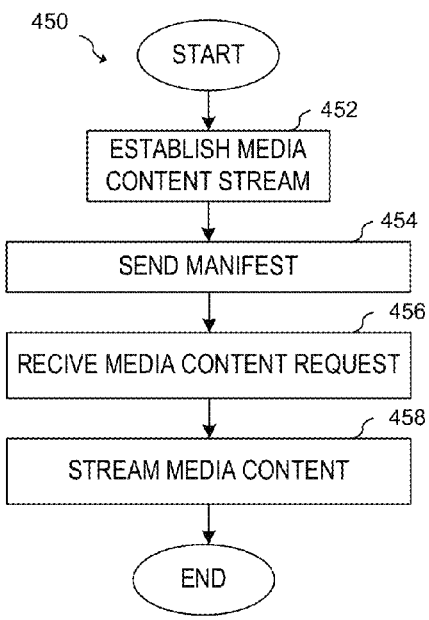

FIG. 4b illustrates server operations according to another embodiment of the present invention. In step 452, this server establishes a media content stream. In an embodiment this media content stream is established upon reception of a URL request for an MPD or manifest file. In step 454 the server sends the manifest file to the client, and in step 456 the server receives a media content request for a particular multiplexed representation according to an access point. The server then streams the media content to the client in step 458.

Figure 5A:
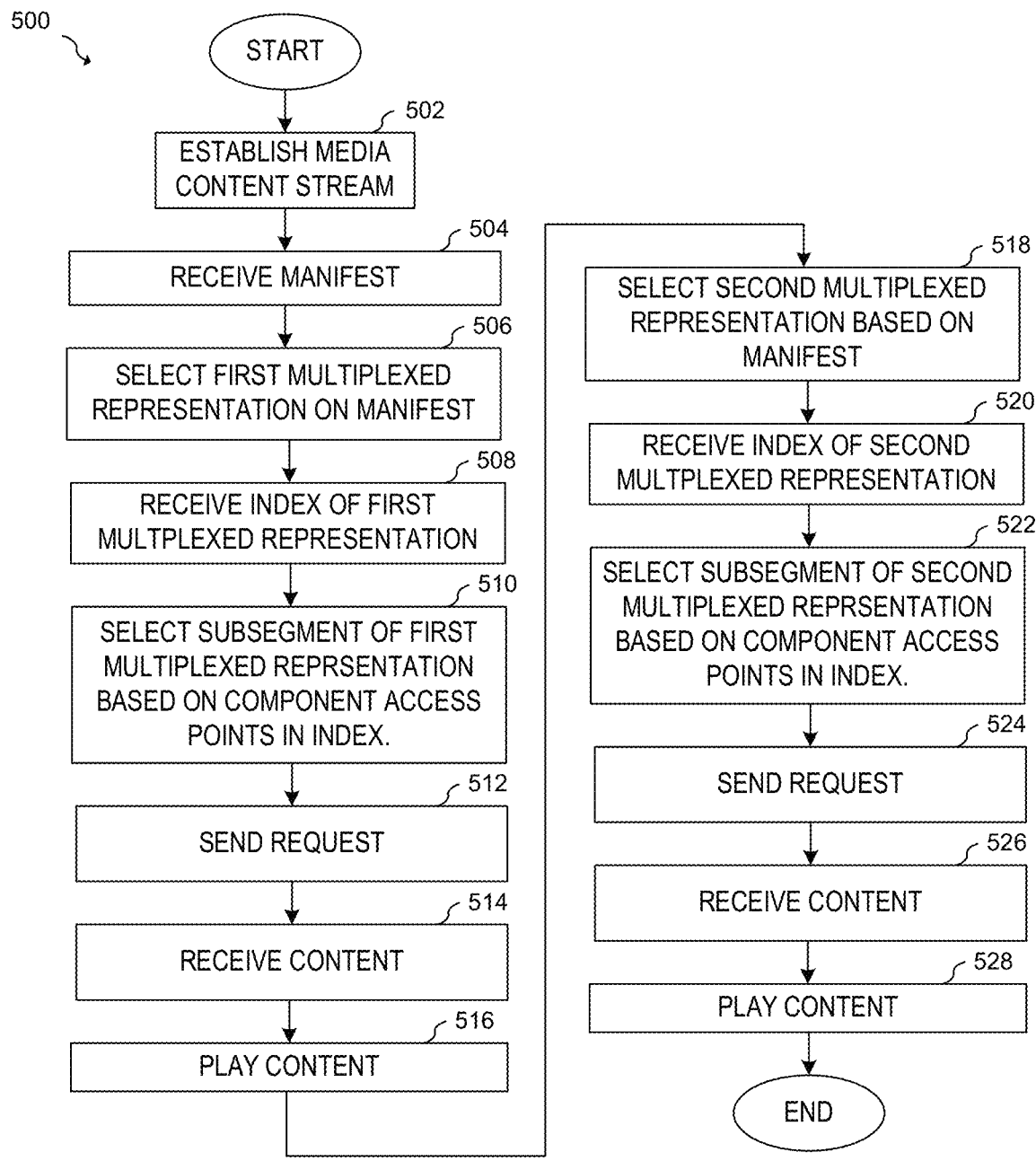
FIGS. 5a-b illustrate other embodiment streaming methods.

FIG. 5A illustrates client operations 500 according to a further embodiment of the present invention. In step 502, the client establishes a media content stream with a server. In step 504, the client receives a manifest, such as an MPD from the server. In an embodiment this manifest contains information regarding multiplexed views and types of access points, such as component access points and/or representation access points according to embodiments described herein. Based on the information in the manifest, the client selects a first multiplexed representation in step 506. In step 508, the client receives an index of the first multiplexed representation. In an embodiment this index may be contained in a separate file or it may be attached to the same streaming file as the requested segment of the first multiplexed representation. In one embodiment this index may be in the form of a segment index box.

In step 510, the client selects a subsegment of the first multiplexed representation based on the RAPs and CAPs listed in the index. Next, a request for the particular subsegment of the first multiplexed representation is sent in step 512, and the content is received from the server in step 514. In step 516 the client plays the content of the first multiplexed representation.

In step 518, the client may select a second multiplexed representation based on data listed in the manifest. As described above, this election may be based on network conditions and/or user input. In step 520 an index of the second multiplexed representation is received, and a subsegment of the second multiplexed representation is selected based on component access points in the index in step 522. A request for this subsegment of the second multiplexed representation is sent in step 524, the content is received in step 526, and the content of the second multiplexed representation is played in step 528. As described above, in some embodiments, the transition from the first multiplexed representation to the second multiplexed representation is a seamless transition. One way in which such a seamless transition is affected is due to the fact that the changeover from the first multiplexed representation to the second multiplexed representation is efficient because the first decodable subsegment for a particular presentation time is directly accessed without having to access a decodable access points.

Figure 5B:
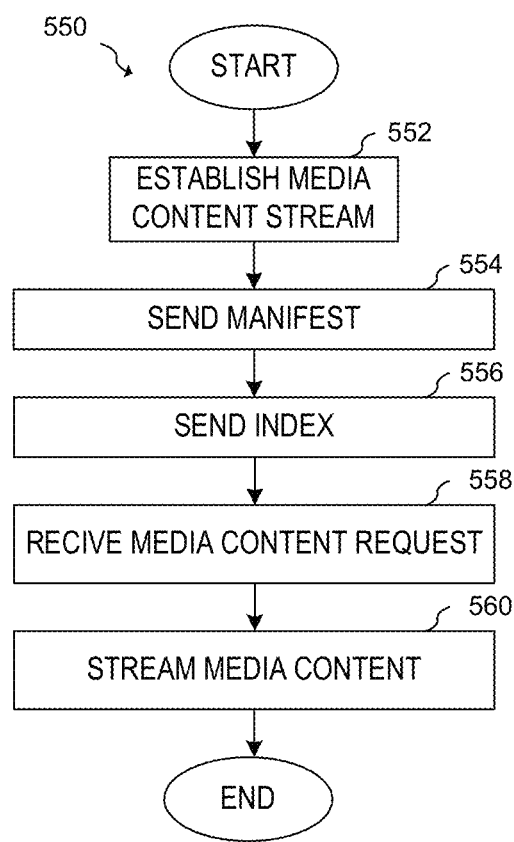

FIG. 5b illustrates server operations 500 according to an alternative embodiment of the present invention. In step 552 the server establishes a media content stream with a client, and in step 554 the server sends a manifest to the client. As described above, this manifest contains information about various multiplexed representations as well as information regarding CAPs and RAPs. In step 556 the server sends and index of CAPs and/or RAPs to the client. In one embodiment, this index is based on a selected multiplexed representation and may be attached to a multiplexed streaming segment file. Alternatively this index may be an independent file requested by the client. In step 558, the server receives a media content request from the client based on a selected multiplexed representation and access point selected by the client. This request may be in the form of a URL in the case of HTTP streaming. In step 560, the server streams the selected media content to the client.

Figure 6:
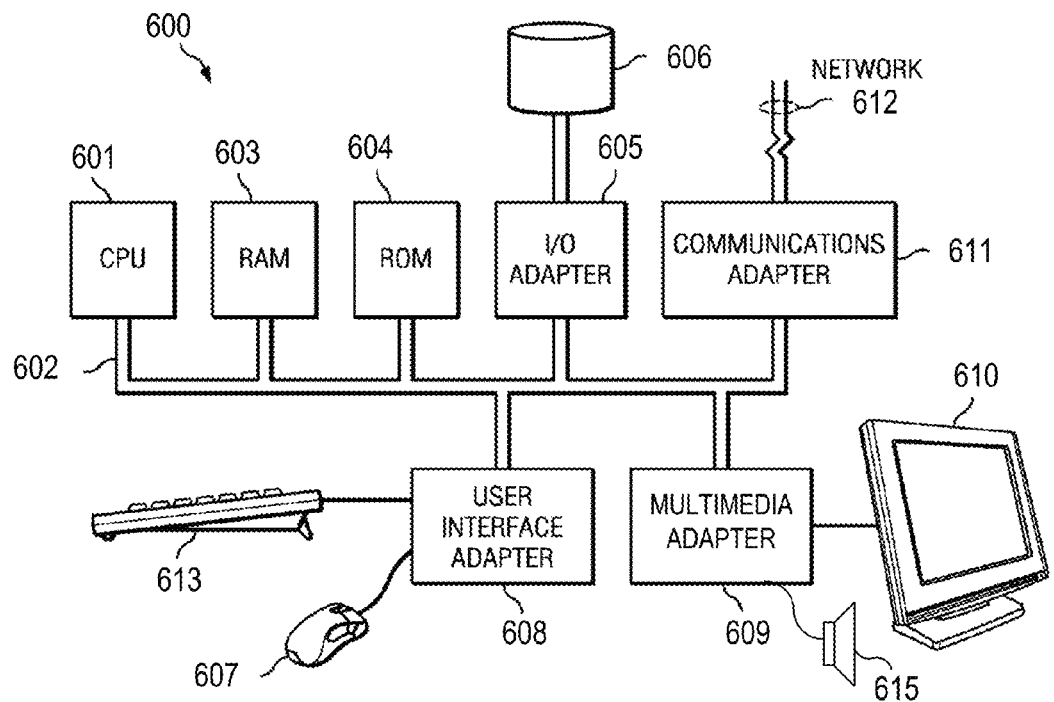
FIG. 6 illustrates a computer system for implementing embodiment methods.

FIG. 6 illustrates computer system 600 adapted to use embodiments of the present invention, e.g., storing and/or executing software associated with the embodiments. Central processing unit (CPU) 601 is coupled to system bus 602. CPU 601 may be any general purpose CPU. However, embodiments of the present invention are not restricted by the architecture of CPU 601 as long as CPU 601 supports the inventive operations as described herein. Bus 602 is coupled to random access memory (RAM) 603, which may be SRAM, DRAM, or SDRAM. ROM 604 is also coupled to bus 602, which may be PROM, EPROM, or EEPROM. RAM 603 and ROM 404 hold user and system data and programs as is well known in the art.

Bus 602 is also coupled to input/output (I/O) adapter 605, communications adapter 611, user interface 608, and multimedia adaptor 609. The I/O adapter 605 connects storage devices 606, such as one or more of a hard drive, a CD drive, a floppy disk drive, a tape drive, to computer system 600. The I/O adapter 605 is also connected to a printer (not shown), which would allow the system to print paper copies of information such as documents, photographs, articles, and the like. Note that the printer may be a printer, e.g., inkjet, laser, and the like, a fax machine, scanner, or a copier machine. User interface adaptor 608 is coupled to keyboard 613 and mouse 607, as well as other devices, and communications adaptor 611 is coupled to network 612 from which embodiment media files may be received. Multimedia adapter 609, which can be a display and/or audio card in some embodiments, is connected to display device 610 and audio device 615. Display device 610 can be a CRT, flat panel display, or other type of display device, and audio device 615 can be a loudspeaker, headphones, or other analog or digital audio system.

Figure 7:
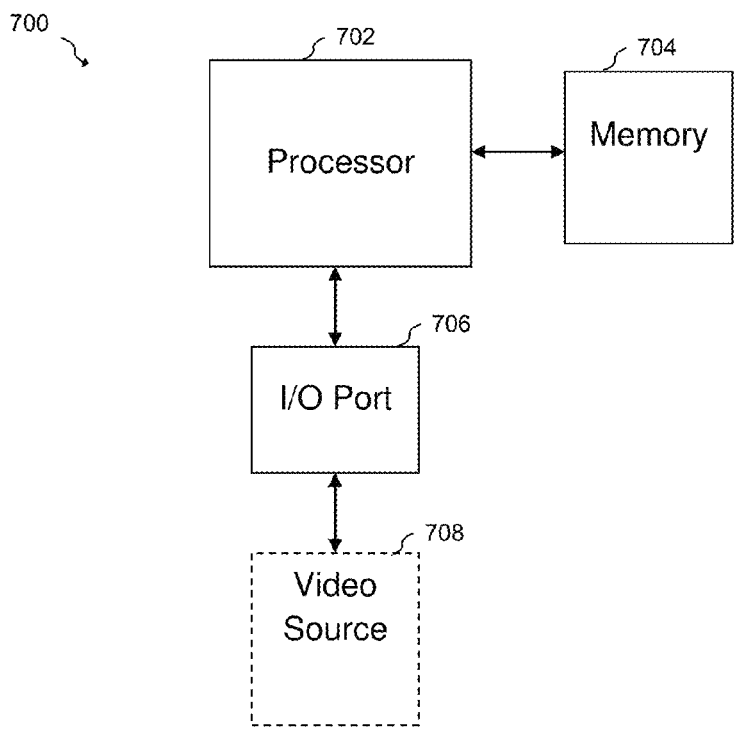
FIG. 7 illustrates a further computer system for implementing embodiment methods.

FIG. 7 illustrates further processing system 700 that can be utilized to implement methods of the present invention. In this case, the main processing is performed in processor 702, which can be a microprocessor, digital signal processor or any other appropriate processing device. Program code (e.g., the code implementing the algorithms disclosed above) and data can be stored in memory 704. The memory can be local memory such as DRAM or mass storage such as a hard drive, optical drive or other storage (which may be local or remote). While the memory is illustrated functionally with a single block, it is understood that one or more hardware blocks can be used to implement this function.

In one embodiment, the processor can be used to implement various ones (or all) of the functions discussed above. For example, the processor can serve as a specific functional unit at different times to implement the subtasks involved in performing the techniques of the present invention. Alternatively, different hardware blocks (e.g., the same as or different than the processor) can be used to perform different functions. In other embodiments, some subtasks are performed by the processor while others are performed using a separate circuitry.

FIG. 7 also illustrates I/O port 706, which can be used to provide the video to and from the processor. Video source 708 (the destination is not explicitly shown) is illustrated in dashed lines to indicate that it is not necessary part of the system. For example, the source can be linked to the system by a network such as the Internet or by local interfaces (e.g., a USB or LAN interface).

In accordance with an embodiment, a method of operating a streaming media client includes electronically receiving, from a network, information regarding component access points of the first multiplexed representation of a streaming content. In some embodiments, this multiplexed representation may be included in a streaming file. The first multiplexed representation of the streaming content includes a plurality of media components, and each component access point defines an independently coded access point for one of the plurality of media components. The method further includes selecting a first segment or subsegment of the first multiplexed representation of the streaming content based on the information regarding the component access points, and requesting the selected first segment or subsegment of the first multiplexed representation of the streaming content from the network.

In an embodiment, the method also includes receiving the first segment or subsegment from the network, and playing back the requested first segment or subsegment. Electronically receiving information regarding component access points may also include receiving a manifest from a server, where the manifest identifies a component access point and may include a media presentation description (MPD). In some embodiments, the component access point type indicates whether access units of a media component following a particular component access point are all decodable and/or whether access units of the media component follow the particular component access point in presentation order. Moreover, electronically receiving information regarding component access points may also receiving an index of component access points of the first multiplexed representation of the streaming content. In some embodiments, this index may be in the form of a segment index box.

In an embodiment, a first plurality of the media components includes a video component, and a second of the plurality of media components includes an audio component.

In an embodiment, the method also includes changing requesting segments or subsegments from the first multiplexed representation of the streaming content to a second multiplexed representation of the streaming content. Changing multiplexed representations may include selecting a second segment or subsegment of a second multiplexed representation of the streaming content based on the electronically received information regarding component access points, requesting the selected second segment or subsegment of the second multiplexed representation of the streaming content, and receiving the requested second segment or subsegment from the network. The first multiplexed representation may include a first version of a first media component, and a first version of a second media component; and the second multiplexed representation may include the first version of the first media component and a second version of the second media component. The first version of the first media component may be an audio component, the first version of the second media component may be a video component at a first video resolution or a first bit rate, and the second version of the second media component may be the video component at a second video resolution or a second bit rate. In some embodiments, the method may also include determining whether to change multiplexed representations based on network conditions or available network resources before changing multiplexed representations of the streaming content. The method may further include playing back the requested first segment or subsegment, and playing back the requested second segment or subsegment after playing back the requested first segment or subsegment. In some embodiments, a change from the first segment or subsegment to the second segment or subsegment occurs seamlessly.

In accordance with a further embodiment, a method of operating a streaming media server includes electronically transmitting to a client information regarding component access points of the first multiplexed representation of the streaming content. The first multiplexed representation of the streaming content includes a plurality of media components, and each component access point defines an independently coded access unit for one of the plurality of components. The method further includes receiving a request from the client for a first segment or subsegment of the first multiplexed representation of the streaming content according to a selected component access point, and transmitting the requested first segment or subsegment of the first multiplexed representation of the streaming content to the client.

In an embodiment, electronically transmitting information regarding component access points includes transmitting a manifest to the client, where the manifest identifies a component access point type. The manifest may include a media presentation description (MPD). In an embodiment, the component access point type indicates whether all access units of a media component following the component access points are all decodable and/or whether access units following a component access point follow the particular component access point in presentation order. In some embodiments, electronically transmitting information regarding component access points conclusions transmitting an index of component access points of the first multiplexed representation of the streaming content to the client.

In an embodiment a first of the plurality of media components includes a video component, and a second of the plurality of media components includes an audio component.

In an embodiment, the method also includes receiving a request from the client for a second segment or subsegment of a second multiplexed representation of the streaming content according to a further selected component access point, where the second multiplexed representation of the streaming content includes a second multiplexed representation of the plurality of media components. The method may also include transmitting the requested second segment or subsegment of the multiplexed representation of the streaming content to the client. The first multiplexed representation may include a first version of a first media component and a first version of a second media component, and the second multiplexed representation may include the first version of the first media component and a second version of the second media component. In some embodiments the first version of the first media component includes an audio component, the first version of the second media component includes a video component at a first video resolution, and the second version of the second media component includes the video component at a second video resolution.

In accordance with a further embodiment, a system for receiving streaming media content includes a communications adapter and a processor. The communication adapter receives information regarding component access points of the first multiplexed representation of the streaming content from a network, wherein the first multiplexed representation of the streaming content includes a plurality of media components, and each component access point defines an independently coded access unit for one of the plurality of media components. The processor selects a first segment or subsegment of the first multiplexed representation of the streaming content based on the information regarding the component access points, and requests the selected first segment or subsegment of the first multiplexed representation of the streaming content.

In some embodiments, the system also includes a multimedia adapter configured to play back the first segment or subsegment of the first multiplexed representation of the streaming content. In an embodiment, the processor requests the selected first segment or subsegment of the first multiplexed representation of the streaming content by using HTTP requests with URLs derived based on the information regarding component access points.

In an embodiment, the processor further changes multiplexed representations from the first multiplexed representation to a second multiplexed representation by selecting a second segment or subsegment of a second multiplexed representation of the streaming content based on the electronically received information regarding component access points, and requests the selected second segment or subsegment of the second multiplexed representation of the streaming content from the network. In an embodiment, the first multiplexed representation includes a first version of a first media component and a first version of a second media component, and the second multiplexed representation includes the first version of the first media component and a second version of the second media component. The first version of the first media component may be an audio component, the first version of the second media component may be a video component at a first visit video resolution or first bitrate, and the second version of the second component may be the video component at a second video resolution or second bitrate.

In accordance with a further embodiment, a non-transitory computer readable medium having an executable program stored thereon that instructs a microprocessor to perform the steps of receiving, from a network, information regarding component access points of the first multiplexed representation of the streaming content, selecting a first segment or subsegment of the first multiplexed representation of the streaming content based on the information regarding the component access points, and requesting the selected first segment or subsegment of the first multiplexed representation of the streaming content from the network. The first multiplexed representation of the streaming content includes a plurality of media components, and each component access point defines an independently coded access unit for one of the plurality of components.

In an embodiment, the program further instructs the microprocessor to receive the first selected segment or subsegment from the network and play the received first segment or subsegment. The program may further instructs the microprocessor to change multiplexed representations from the first multiplexed representation to a second multiplexed representation by selecting a second segment or subsegment of a second multiplexed representation of the streaming content based on the electronically received information regarding component access points, and requesting the selected second segment or subsegment of the second multiplexed representation of the streaming content. In some embodiments, the first multiplexed representation includes a first version of the first media component and a first version of a second media component, and the second multiplexed representation includes the first version of the first media component and a second version of the second media component. The first version of the first media component may include an audio component, the first version of the second media component may include a video component at a first video resolution, and the second version of the second media component may include the video component at a second video resolution.

In an embodiment, the program further instructs the microprocessor to receive the first segment or subsegment from the network, play back the requested first segment or subsegment, receive the requested second segment or subsegment from the network, and play back the requested second segment or subsegment after playing back the requested first segment or subsegment.

Embodiments of the present invention provide a number of advantageous features. For example, embodiments provide an improved mechanism for identifying and signaling of media segments starting with a representation access point in a multiplexed representation. Embodiments also provide an improved mechanism for signaling of representation access points in media segments of a multiplexed representation. Various embodiments also provide an improved mechanism for signaling of the presentation time of the first representation access point in a subsegment in a media segment of a multiplexed representation.

Further advantages of some embodiments include the ability to seamlessly transition from a first multiplexed view to a second multiplexed view without delay caused by downloading access units that are undecodable or are devoted to presentation times that occur before the presentation time at which a streaming component transitions from the first view to the second view.

Although present embodiments and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of operating a streaming media client, the method comprising:
    electronically receiving, from a network, information regarding component access points (CAPs) of a first multiplexed representation of a streaming content, wherein the first multiplexed representation of the streaming content comprises a plurality of media components, wherein each of the CAPs defines an independently coded access unit for one of the plurality of media components and identifies a position in the first multiplexed representation enabling playback of the respective media component using information contained in data in the first multiplexed representation after the respective CAP and independently of information in the multiplexed representation before the respective CAP, wherein each group of CAPs of a plurality of groups of the CAPs is associated with a respective one of the plurality of media components;
    identifying a stream access point (SAP) in the first multiplexed representation of the streaming content based on the information regarding the CAPs, wherein the SAP identifies a position in the first multiplexed representation enabling playback of the first multiplexed representation using information contained in the first multiplexed representation starting from that position onwards, wherein at least one of the CAPs of each group of CAPS identifies a position in the first multiplexed representation that is different from the position in the first multiplexed representation identified by the SAP, wherein at least one of the CAPs of each group of CAPS identifies a position in the first multiplexed representation that is different from positions in the first multiplexed representation identified by each of the CAPs in at least one of the other ones of the plurality of groups of the CAPs, and wherein the SAP corresponds to an $I_{SAP}$ and a $T_{SAP}$, and wherein:
        the $I_{SAP}$ is a byte position in the first multiplexed representation, and
        the $T_{SAP}$ is an earliest presentation time, for any access unit of the media stream, that all access units of the media stream with a presentation time of at least the $T_{SAP}$ can be correctly decoded using the information contained in the first multiplexed representation starting at the $I_{SAP}$ and no information before the $I_{SAP}$;
    selecting a first segment or subsegment of the first multiplexed representation of the streaming content based on the SAP; and
    requesting the selected first segment or subsegment of the first multiplexed representation of the streaming content from the network.

2. The method of claim 1, further comprising:
    receiving the requested first segment or subsegment from the network; and
    playing back the requested first segment or subsegment.

3. The method of claim 1, wherein electronically receiving information regarding component access points comprises receiving a manifest from a server, the manifest identifying a component access point type.

4. The method of claim 3, wherein the manifest comprises a media presentation description (MPD).

5. The method of claim 3, wherein the component access point type indicates whether all access units of a media component following a particular component access point are all decodable.

6. The method of claim 3, wherein the component access point type indicates whether all access units of a media component following a particular component access point follow the particular component access point in presentation order.

7. The method of claim 1, wherein electronically receiving information regarding component access points comprises receiving an index of component access points of a segment or subsegment of the first multiplexed representation of the streaming content.

8. The method of claim 7, wherein the index is defined by a segment index box.

9. The method of claim 1, wherein:
    a first of the plurality of media components comprises a video component; and
    a second of the plurality of media components comprises an audio component.

10. The method of claim 1, further comprising:
    changing requesting segments or subsegments from the first multiplexed representation of the streaming content to a second multiplexed representation of the streaming content, wherein changing the requesting segments or subsegments comprises:
        selecting a second segment or subsegment of the second multiplexed representation of the streaming content based on the information regarding component access points,
        requesting the selected second segment or subsegment of the second multiplexed representation of the streaming content, and
        receiving the requested second segment or subsegment from the network.

11. The method of claim 10, wherein:
    the first multiplexed representation of the streaming content comprises a first version of a media first component and a first version of a second media component;
    the second multiplexed representation of the streaming content comprises the first version of the first media component and a second version of the second media component;
    the first version of the first media component comprises an audio component;
    the first version of the second media component comprises a video component at a first video resolution or a first bitrate; and
    the second version of the second component comprises the video component at a second video resolution or a second bitrate.

12. The method of claim 10, further comprising: determining whether to change multiplexed representations of the streaming content based on network conditions or available network resources before changing requesting segments or subsegments from the first multiplexed representation of the streaming content to the second multiplexed representation of the streaming content.

13. The method of claim 10, further comprising:
playing back the requested first segment or subsegment; and
playing back the requested second segment or subsegment after playing back the requested first segment, wherein a change from the first segment or subsegment to the second segment or subsegment occurs seamlessly.

14. A method of operating a streaming media server, the method comprising:
electronically transmitting, to a client, information regarding component access points (CAPs) of a first multiplexed representation of a streaming content, wherein the first multiplexed representation of the streaming content comprises a plurality of media components, wherein each group of CAPS of a plurality of groups of CAPs is associated with a respective one of the plurality of the media components, wherein each of the CAPs defines an independently coded access unit for the respective one of the plurality of media components and identifies a position in the first multiplexed representation enabling playback of the respective media component using the information contained in data in the first multiplexed representation after the respective CAP and independently of information in the multiplexed representation before the respective CAP, and wherein the information regarding CAPs is configured to signal a stream access point (SAP) identifying a position in the first multiplexed representation enabling playback of the first multiplexed representation using information contained in the first multiplexed representation starting from that position onwards, wherein at least one of the CAPs of each group of CAPs identifies a position in the first multiplexed representation that is different from the position in the first multiplexed representation identified by the SAP, wherein at least one of the CAPs of each group of CAPS identifies a position in the first multiplexed representation that is different from positions in the first multiplexed representation identified by each of the CAPs in at least one of the other ones of the plurality of groups of the CAPs, wherein the SAP corresponds to an $I_{SAP}$ and a $T_{SAP}$, and wherein:
the $I_{SAP}$ is a byte position in the first multiplexed representation, and
the $T_{SAP}$ is an earliest presentation time, for any access unit of the media stream, that all access units of the media stream with a presentation time of at least the $T_{SAP}$ can be correctly decoded using the information contained in the first multiplexed representation starting at the $I_{SAP}$ and no information before the $I_{SAP}$;
receiving a request from the client for a first segment or subsegment of the first multiplexed representation of the streaming content according to a selected CAP of the CAPS; and
transmitting the requested first segment or subsegment of the first multiplexed representation of the streaming content to the client.

15. The method of claim 14, wherein electronically transmitting information regarding component access points comprises transmitting a manifest to the client, the manifest identifying a component access point type.

16. The method of claim 15, wherein the manifest comprises a media presentation description (MPD).

17. The method of claim 15, wherein the component access point type indicates whether all access units of a media component following the component access points are all decodable.

18. The method of claim 15, wherein the component access point type indicates whether access units of a media component following a particular component access point follow the particular component access point in presentation order.

19. The method of claim 14, wherein electronically transmitting information regarding component access points comprises transmitting an index of component access points of the first multiplexed representation of the streaming content to the client.

20. The method of claim 14, wherein:
a first of the plurality of media components comprises a video component; and
a second of the plurality of media components comprises an audio component.

21. The method of claim 14, further comprising: receiving a request from the client for a second segment of subsegment of a second multiplexed representation of the streaming content according to a further selected component access point, wherein the second multiplexed representation of the streaming content comprises a second multiplexed representation of the plurality of media components; and
transmitting the requested second segment of subsegment of the second multiplexed representation of the streaming content to the client.

22. The method of claim 21, wherein:
the first multiplexed representation of the streaming content comprises a first version of a first media component and a first version of a media second component;
the second multiplexed representation of the streaming content comprises the first version of the first media component and a second version of the second media component;
the first version of the first media component comprises an audio component;
the first version of the second media component comprises a video component at a first video resolution; and
the second version of the second media component comprises the video component at a second video resolution.

23. A system for receiving streaming media content, the system comprising:
a communications adapter configured to receive information regarding component access points (CAPs) of a first multiplexed representation of a streaming content from a network, wherein the first multiplexed representation of the streaming content comprises a plurality of media components, wherein each group of CAPs of a plurality of groups of the CAPs is associated with a respective one of the plurality of the media components and each CAP defines an independently coded access unit for the respective one of the plurality of media components and identifies a position in the first multiplexed representation enabling playback for the respective media component using the information contained in data in the first multiplexed representation after the respective CAP and independently of information in the multiplexed representation before the respective CAP; and
a processor configured to identify a stream access point (SAP) in the first representation of the streaming content based on the information regarding the CAPs, to select a first segment or subsegment of the first multiplexed representation of the streaming content based on the SAP, and to request the selected first segment or subsegment of the first multiplexed representation of the streaming content, wherein the SAP identifies a position in the first multiplexed representation enabling playback of a media stream using information contained in the first multiplexed representation starting from that position onwards, wherein at least one of the CAPs in each of the group of the CAPs identifies a position in the first multiplexed representation that is different from the position in the first multiplexed representation identified by the SAP, wherein at least one of the CAPs of each group of CAPS identifies a position in the first multiplexed representation that is different from positions in the first multiplexed representation identified by each of the CAPs in at least one of the other ones of the plurality of groups of the CAPs, and wherein the SAP corresponds to $I_{SAP}$ and a $T_{SAP}$, and wherein:

the $I_{SAP}$ is a byte position in the first multiplexed representation, and the $T_{SAP}$ is an earliest presentation time, for any access unit of the media stream, that all access units of the media stream with a presentation time of at least the $T_{SAP}$ can be correctly decoded using the information contained in the first multiplexed representation starting at the $I_{SAP}$ and no information before the $I_{SAP}$.

24. The system of claim 23, further comprising a multimedia adaptor configured to play back the first segment or subsegment of the first multiplexed representation of the streaming content.

25. The system of claim 23, wherein the processor is configured to request the selected first segment or subsegment of the first multiplexed representation of the streaming content by using HTTP requests with URLs derived based on the information regarding component access points.

26. The system of claim 23, wherein the processor is further configured to switch from the first multiplexed representation of the streaming content to a second multiplexed representation of the streaming content by selecting a second segment or subsegment of the second multiplexed representation of the streaming content based on received information regarding CAPs and requesting the selected second segment or subsegment of the second multiplexed representation of the streaming content from the network.

27. The system of claim 26, wherein the first multiplexed representation comprises a first version of a first media component and a first version of a second media component; and the second multiplexed representation comprises the first version of the first media component and a second version of the second media component.

28. The system of claim 27, wherein:

the first version of the first media component comprises an audio component;

the first version of the media second component comprises a video component at a first video resolution or a first bitrate; and the second version of the second component comprises the video component at a second video resolution or a second bitrate.

29. A non-transitory computer readable medium with an executable program stored thereon, wherein the program instructs a microprocessor to perform the following steps:

receive, from a network, information regarding component access points (CAPS) of a first multiplexed representation of a streaming content, wherein the first multiplexed representation of the streaming content comprises a plurality of media components, wherein each group of CAPs of a plurality of groups of the CAPs is associated with a respective one of the plurality of the media components and each CAP defines an independently coded access unit for the respective one of the plurality of media components and identifies a position in the first multiplexed representation enabling playback for the respective media component using the information contained in data in the first multiplexed representation after the respective CAP and independently of information in the multiplexed representation before the respective CAP;

identify a stream access point (SAP) in the first multiplexed representation of the streaming content based on the information regarding the CAPs, wherein the SAP identifies a position in the first multiplexed representation enabling playback of a media stream using the information contained in the first multiplexed representation starting from that position onwards, wherein the SAP corresponds to a $I_{SAP}$ and a $T_{SAP}$, wherein at least one of the CAPs of each group of the CAPs identifies a position in the first multiplexed representation that is different from the position in the first multiplexed representation identified by the SAP, wherein at least one of the CAPs of each group of CAPS identifies a position in the first multiplexed representation that is different from positions in the first multiplexed representation identified by each of the CAPs in at least one of the other ones of the plurality of groups of the CAPs, and wherein:

the $I_{SAP}$ is a byte position in the first multiplexed representation, and the $T_{SAP}$ is an earliest presentation time, for any access unit of the media stream, that all access units of the media stream with a presentation time of at least the $T_{SAP}$ can be correctly decoded using the information contained in the first multiplexed representation starting at the $I_{SAP}$ and no information before the $I_{SAP}$;

select a first segment or subsegment of the first multiplexed representation of the streaming content based on the SAP; and request the selected first segment or subsegment of the first multiplexed representation of the streaming content from the network.

30. The non-transitory computer readable medium of claim 29, wherein the program further instructs the microprocessor to receive the requested first segment or subsegment from the network and play the received first segment or subsegment.

31. The non-transitory computer readable medium of claim 29, wherein the program further instructs the microprocessor to change multiplexed representations from the first multiplexed representation of the streaming content to a second multiplexed representation of the streaming content by:

selecting a second segment or subsegment of a second multiplexed representation of the streaming content based on the information regarding CAPs, and requesting the selected second segment or subsegment of the second multiplexed representation of the streaming content.

32. The non-transitory computer readable medium of claim 31, wherein:
the first multiplexed representation of the streaming content comprises a first version of a first media component and a first version of a media second component; and
the second multiplexed representation of the streaming content comprises the first version of the first media component and a second version of the second media component.

33. The non-transitory computer readable medium of claim 32, wherein:
the first version of the first media component comprises an audio component;
the first version of the second media component comprises a video component at a first video resolution or a first bitrate; and
the second version of the second media component comprises the video component at a second video resolution or a second bitrate.

34. The non-transitory computer readable medium of claim 31, wherein the program further instructs the microprocessor to:
receive the requested first segment or subsegment from the network;
play back the requested first segment or subsegment;
receive the requested second segment or subsegment from the network; and
play back the requested second segment after playing back the requested first segment or subsegment.

35. The method of claim 1, wherein the SAP comprises a Closed GoP random access point in which all the access units, in decoding order, starting from the $I_{SAP}$ can be correctly decoded, wherein decoding results in a continuous time sequence of correctly decoded access units with no gaps.

36. The method of claim 35, wherein the SAP is configured to be used for randomly accessing a media presentation at a start-up of the media presentation or after a seeking operation or error event.

37. The method of claim 35, wherein the SAP is configured to be used for switching between two representations whereby for seamless switching a switch-from representation is presented up to the $T_{SAP}$ and each media stream in a switch-to representation is presented from the SAP starting from the $T_{SAP}$.

38. The method of claim 35, wherein the information regarding the CAPs includes an @ startwithSAP attribute that, when present and having a value greater than 0, specifies that each media segment in associated representations starts with a stream access point type that is less than or equal to the value of this attribute value in each media stream.

39. The method of claim 14, wherein the SAP comprises a Closed GoP random access point in which all the access units, in decoding order, starting from the $I_{SAP}$ can be correctly decoded, wherein decoding results in a continuous time sequence of correctly decoded access units with no gaps.

40. The system of claim 23, wherein the SAP comprises an Open GoP random access point in which there are some access units in decoding order following $I_{SAU}$ that cannot be correctly decoded and have presentation times less than the $T_{SAP}$, wherein $I_{SAU}$ is a greatest position in the first multiplexed representation such that all access units of the media stream with a presentation time of at least $T_{SAP}$ can be correctly decoded using data in the first multiplexed representation starting at $I_{SAU}$ and no data before $I_{SAU}$.

41. The method of claim 1, wherein the SAP comprises a Closed GoP random access point in which a first access unit in decoding order in the media stream starting from $I_{SAU}$ is not a first access unit in presentation order, wherein $I_{SAU}$ is a greatest position in the first multiplexed representation such that all access units of the media stream with a presentation time of at least $T_{SAP}$ can be correctly decoded using data in the first multiplexed representation starting at $I_{SAU}$ and no data before $I_{SAU}$.

* * * * *